(12) United States Patent
Matsuoka et al.

(10) Patent No.: US 8,915,539 B2
(45) Date of Patent: Dec. 23, 2014

(54) STRUCTURE FOR FRONT PORTION OF VEHICLE

(75) Inventors: Kiyohiko Matsuoka, Wako (JP);
Shigetaka Kameyama, Wako (JP);
Makoto Kihara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/130,641

(22) PCT Filed: Jun. 29, 2012

(86) PCT No.: PCT/JP2012/066762
§ 371 (c)(1),
(2), (4) Date: Jan. 2, 2014

(87) PCT Pub. No.: WO2013/005685
PCT Pub. Date: Jan. 10, 2013

(65) Prior Publication Data
US 2014/0117720 A1    May 1, 2014

(30) Foreign Application Priority Data
Jul. 4, 2011   (JP) .................................. 2011-148067

(51) Int. Cl.
*B60S 1/04* (2006.01)
*B62D 25/08* (2006.01)

(52) U.S. Cl.
CPC .............. *B62D 25/08* (2013.01); *B62D 25/081* (2013.01)
USPC ....................................................... 296/192

(58) Field of Classification Search
CPC .................. A47B 96/021; B65D 2543/00629; B65D 2543/00685; B65D 2543/00796; B05H 2701/31; H01L 2924/00; H01L 2924/00014; H01L 2224/48463; B41J 11/003; B41J 11/008
USPC ......................................................... 296/192
See application file for complete search history.

(56) References Cited

U.S. PATENT DOCUMENTS

| 6,869,134 | B2 * | 3/2005 | Kato et al. ..................... | 296/192 |
| 7,552,964 | B2 * | 6/2009 | Saito .............................. | 296/192 |
| 8,002,335 | B2 * | 8/2011 | Usuda ........................... | 296/192 |
| 8,152,227 | B2 * | 4/2012 | Kurata et al. .................. | 296/192 |

(Continued)

FOREIGN PATENT DOCUMENTS

| JP | 58-149866 | 9/1983 |
| JP | 2009-101956 | 5/2009 |

OTHER PUBLICATIONS

Japanese Office Action dated Nov. 4, 2014, 3 pages.

*Primary Examiner* — Kiran B Patel
(74) *Attorney, Agent, or Firm* — Rankin, Hill & Clark LLP (57) ABSTRACT

A structure for a front portion of a vehicle is provided with a windshield lower member. The windshield lower member includes a windshield lower member main body, and an extended portion formed so as to extend frontward from a front end portion of the windshield lower member main body. The extended portion includes a base portion formed so as to continue from a front end portion of the windshield lower member main body, a weight portion extending in an obliquely front-upward direction from a front end portion of the base portion, and a weak portion that extends in a vehicle width direction at a boundary between the base portion and the weight portion, and that has lower rigidity than the base portion.

16 Claims, 9 Drawing Sheets

(56) References Cited

U.S. PATENT DOCUMENTS

| | | |
|---|---|---|
| 8,186,749 B2 * | 5/2012 | Serizawa et al. ............ 296/192 |
| 8,474,901 B2 * | 7/2013 | Serizawa et al. ............ 296/192 |
| 8,567,851 B2 * | 10/2013 | Morden et al. .............. 296/192 |
| 8,573,682 B2 * | 11/2013 | Oomen ........................ 296/192 |
| 8,608,235 B2 * | 12/2013 | Matsubara ................... 296/192 |
| 2003/0107243 A1 * | 6/2003 | Hayashi ...................... 296/192 |
| 2005/0179285 A1 * | 8/2005 | Nakajima et al. ............ 296/192 |
| 2006/0186704 A1 * | 8/2006 | Sakai et al. .................. 296/192 |
| 2008/0116721 A1 * | 5/2008 | Shimura ...................... 296/192 |
| 2009/0146459 A1 * | 6/2009 | Watanabe et al. ............ 296/192 |
| 2012/0175913 A1 * | 7/2012 | Makise et al. ............... 296/192 |
| 2013/0221705 A1 * | 8/2013 | Sugishima et al. ........... 296/192 |
| 2013/0320712 A1 * | 12/2013 | Murofushi et al. ........... 296/192 |
| 2014/0265446 A1 * | 9/2014 | Ellison et al. ................ 296/192 |

\* cited by examiner

STRUCTURE FOR FRONT PORTION OF VEHICLE

TECHNICAL FIELD

The present invention relates to a structure for a front portion of a vehicle.

BACKGROUND ART

Conventionally, in order to reduce vibration and noise transmitted to the passenger compartment, the dashboard for isolating the engine room from the passenger compartment is equipped with an insulator having vibration absorption property and noise absorption property.

For example, Patent Document 1 discloses an invention in which an insulator made of foam is fixed on a horizontal section formed in the dashboard in substantially horizontal shape.

Thus, vibration and noise transmitted from the engine room to the dashboard are damped by the insulator, and therefore sympathetic vibration of the dashboard is reduced. As a result, transmission of vibration and noise generated in the engine room is reduced.

PRIOR TECHNICAL DOCUMENT

Patent Document

[Patent Document 1] Japanese Patent Application Laid-Open Publication No. S58-149866

SUMMARY OF THE INVENTION

Technical Problem

However, in the invention described in Patent Document 1, since the dedicated member (insulator) is newly installed for reducing transmission of vibration and noise from the engine room to the passenger compartment, the number of components increases and thereby its manufacturing cost rises.

Moreover, in the invention described in Patent Document 1, since fixing labor is needed for fixing the insulator on the dashboard, the manufacturing cost further rises.

The present invention has been created from this point of view, and its purpose is to provide a structure for a front portion of a vehicle which is capable of reducing vibration and noise generated in the engine room and transmitted to the passenger compartment, while also reducing the manufacturing cost.

Solution to Problem

To solve the above problem, the present invention provides a structure for a front portion of a vehicle, comprising: a dashboard upper member extending frontward from an upper portion of a dashboard lower member isolating an engine room from a passenger compartment; a windshield lower member supporting a lower end portion of a windshield glass; and a cowl top member covering an opening formed between the dashboard upper member and the windshield lower member, wherein the windshield lower member includes: a windshield lower member main body; and an extended portion formed so as to extend frontward from a front end portion of the windshield lower member main body, wherein the extended portion includes: a base portion formed so as to continue from a front end portion of the windshield lower member main body; a weight portion extending in an obliquely front-upward direction from a front end portion of the base portion; and a weak portion extending in a vehicle width direction at a boundary between the base portion and the weight portion, the weak portion having lower rigidity than the base portion.

According to the present invention, when vibration and noise generated in the engine room are transmitted to the windshield lower member, the weight portion, which is furthest from the windshield lower member main body, vibrates (oscillates) in an up-down direction with respect to a pivot point at the weak portion having lower rigidity than the base portion. As a result, vibration of the weight portion becomes antiphase relative to vibration and noise transmitted to the windshield lower member. This makes it possible to damp vibration and noise transmitted to the windshield lower member at the weight portion, and to reduce transmission of vibration and noise from the engine room into the passenger compartment.

Moreover, according to the present invention, by forming the extended portion integrally with the windshield lower member main body, the windshield lower member, which has conventionally been provided in vehicles, exercises vibration absorption function and noise absorption function. This makes it unnecessary to provide an insulator separately so that the number of components can be reduced.

Further, according to the present invention, by forming the extended portion integrally with the windshield lower member main body, the number of manufacturing steps can be reduced compared to the prior arts that require a fixing step for fixing an insulator on the dashboard.

Accordingly, the number of components and the number of manufacturing steps can be reduced, and thereby manufacturing cost can be reduced compared to prior arts.

Moreover, according to the present invention, by providing the weak portion having lower rigidity than the base so as to extend in the vehicle width direction at the boundary between the base portion and the weight portion, the extended portion (weight portion) becomes susceptible to bending downwardly with respect to the pivot point at the weak portion when the weight portion receives collision load from upward, so that collision energy can be absorbed preferably.

Moreover, it is preferred that the base portion is structured to have a stair-like step near a boundary with the front end portion of the windshield lower member main body.

According the above structure, since the base portion has a stair-like step near a boundary with the front end portion of the windshield lower member main body, the rigidity of the base portion is increased. Thereby, the weight portion becomes susceptible to vibration in the up-down direction, and damping effect can be further enhanced.

Moreover, it is preferred that the weight portion is structured to have a protruding portion protruding outward in the vehicle width direction from outer ends in the vehicle width direction of the base portion and the weak portion.

According to the above structure, since the weight portion has a protruding portion protruding outward in the vehicle width direction from the outer ends in the vehicle width direction of the base portion and the weak portion, the mass of the weight portion is increased. Thereby, the weight portion becomes susceptible to vibration in the up-down direction, and damping effect can be further enhanced.

Moreover, it is preferred that the base portion is structured to have a connecting portion connecting with the cowl top member.

According to the above structure, since the base portion is connected with the cowl top member via the connecting portion, the rigidity of the base portion is increased. Thereby, the weight portion becomes susceptible to vibration in the up-down direction, and damping effect can be further enhanced.

Moreover, it is preferred that the windshield lower member main body is structured to have a maximum portion at which width dimension in a front-rear direction is the largest, in either one of two sides in the vehicle width direction with respect to a center line running along the front-rear direction and passing through a center in the vehicle width direction of the windshield lower member main body, and the extended portion is provided on a side opposite to the maximum portion with respect to the center line.

Among the windshield lower member main body, the maximum portion, at which the width dimension in the front-rear direction becomes largest, vibrates most sympathetically with vibration and noise transmitted from the engine room. According to the above structure, since the extended portion is provided on the side opposite to the maximum portion with respect to the center line running along the front-rear direction and passing through the center in the vehicle width direction of the windshield lower member main body, damping effect can be further enhanced.

Advantageous Effects of Invention

The present invention provides a structure for a front portion of a vehicle which is capable of reducing vibration and noise generated in the engine room and transmitted to the passenger compartment, while also reducing manufacturing cost.

DETAILED DESCRIPTION

An embodiment of the present invention will be described in detail with reference to the drawings. In the description, the same reference numerals are given to the same elements, and redundant explanations thereof will be omitted.

In addition, when indicating a direction in the description, explanations will be made with reference to front and rear, left and right, top and bottom (up and down, upper and lower) of vehicle. "Vehicle width direction" is synonymous with "lateral direction."

Figure 1:
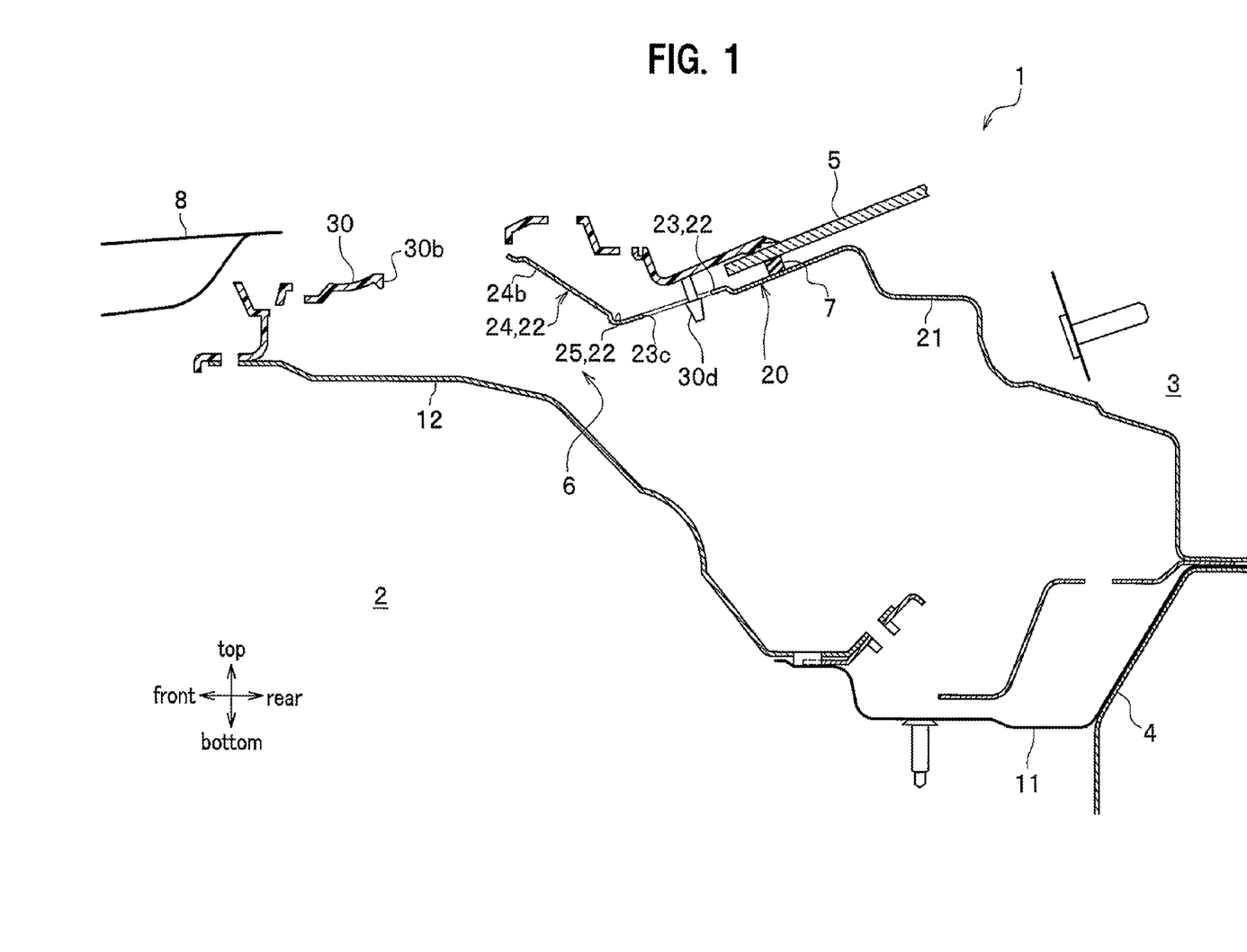
FIG. 1 is a sectional side view of a structure for a front portion of a vehicle according to an embodiment of the present invention.

As shown in FIG. 1, a vehicle front structure (a structure for a front portion of a vehicle) 1 according to an embodiment of the present invention is applied to a front-engine vehicle, and comprises a dashboard upper member 11, a lid dashboard upper member 12, a windshield lower member 20, and a cowl top member 30.

[Dashboard Upper Member and Lid Dashboard Upper Member]

The dashboard upper member 11 is a member made of a steel plate, which extends frontward from an upper portion of a dashboard lower member 4 for isolating an engine room 2 from a passenger compartment (vehicle interior) 3. In the present embodiment, the dashboard upper member 11 is secured on the dashboard lower member 4 by welding or the like. The lid dashboard upper member 12 is a member made of a steel plate, which extends front-upward from a front end of the dashboard upper member 11. In the present embodiment, the lid dashboard upper member 12 is secured on the dashboard upper member 11 by welding or the like. The dashboard upper member 11 and the lid dashboard upper member 12 correspond to the "dashboard upper member" in the claims.

It is noted that the reference numeral 8 in FIG. 1 indicates a bonnet hood.

[Windshield Lower Member]

Figure 2:
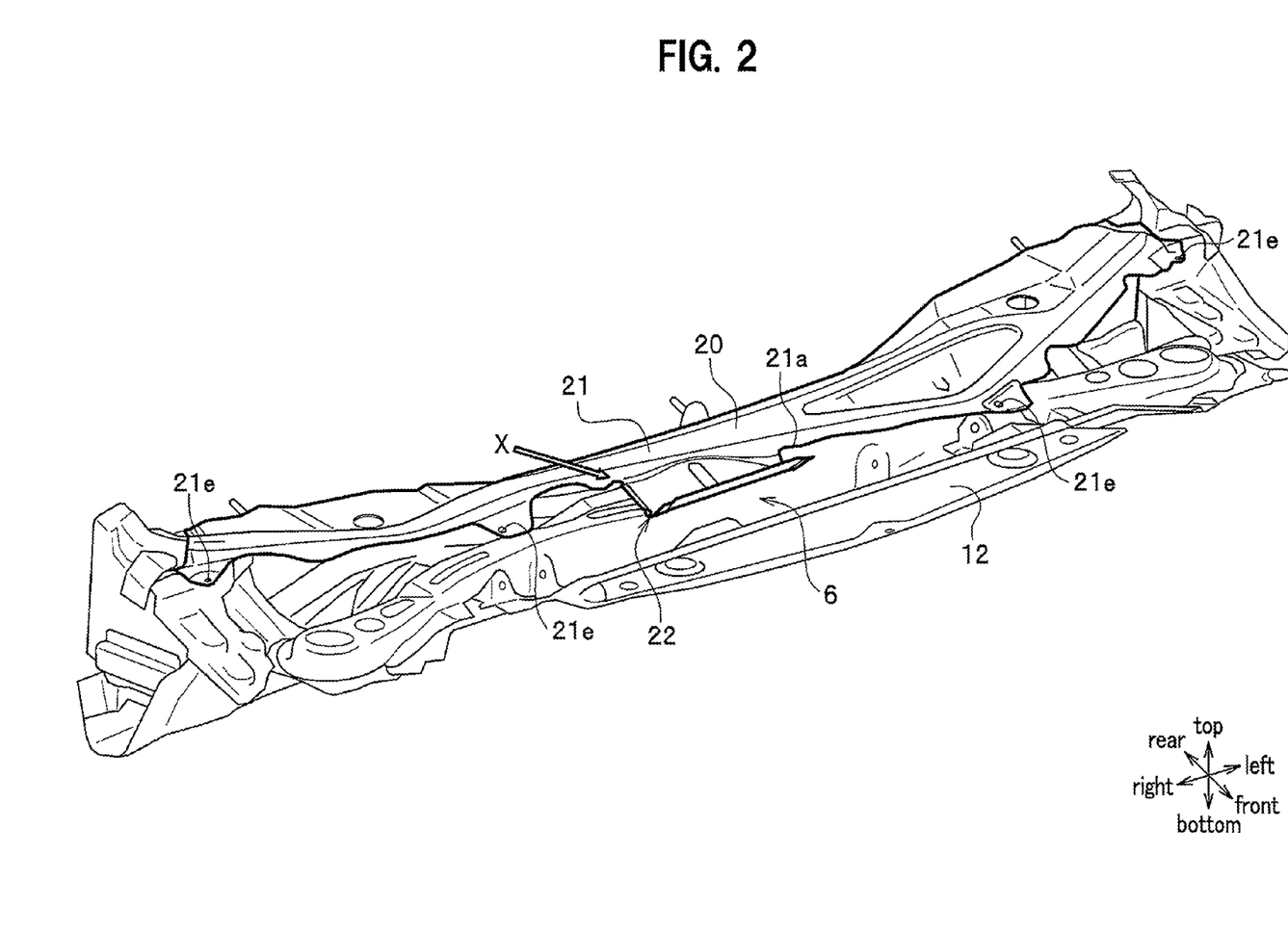
FIG. 2 is a perspective view of a lid dashboard upper member and a windshield lower member according to the embodiment of the present invention.

The windshield lower member 20 is a member made of a steel plate, which supports a lower end portion of a windshield glass 5. As shown in FIG. 1 and FIG. 2, an opening 6 is formed between the lid dashboard upper member 12 and the windshield lower member 20. In the present embodiment, the windshield lower member 20 supports the windshield glass 5 at its one end, and a buffer material 7 is provided between the windshield lower member 20 and the windshield glass 5.

As shown in FIG. 2, the windshield lower member 20, which is formed by press molding a sheet of steel plate, comprises a windshield lower member main body 21, and an extended portion 22 that extends frontward from a front end portion 21a of the windshield lower member main body 21. The windshield lower member 20 may be formed by press molding a plate made of other metal such as aluminum.

The windshield lower member main body 21 and the extended portion 22 will later be described in detail with reference to FIG. 5 to FIG. 7.

[Cowl Top Member]

As shown in FIG. 1, the cowl top member 30 is a resinous member, which constitutes what is called "cowl box" by covering the opening 6 together with the lid dashboard upper member 12 and the windshield lower member 20.

Figures 3A, 3B:
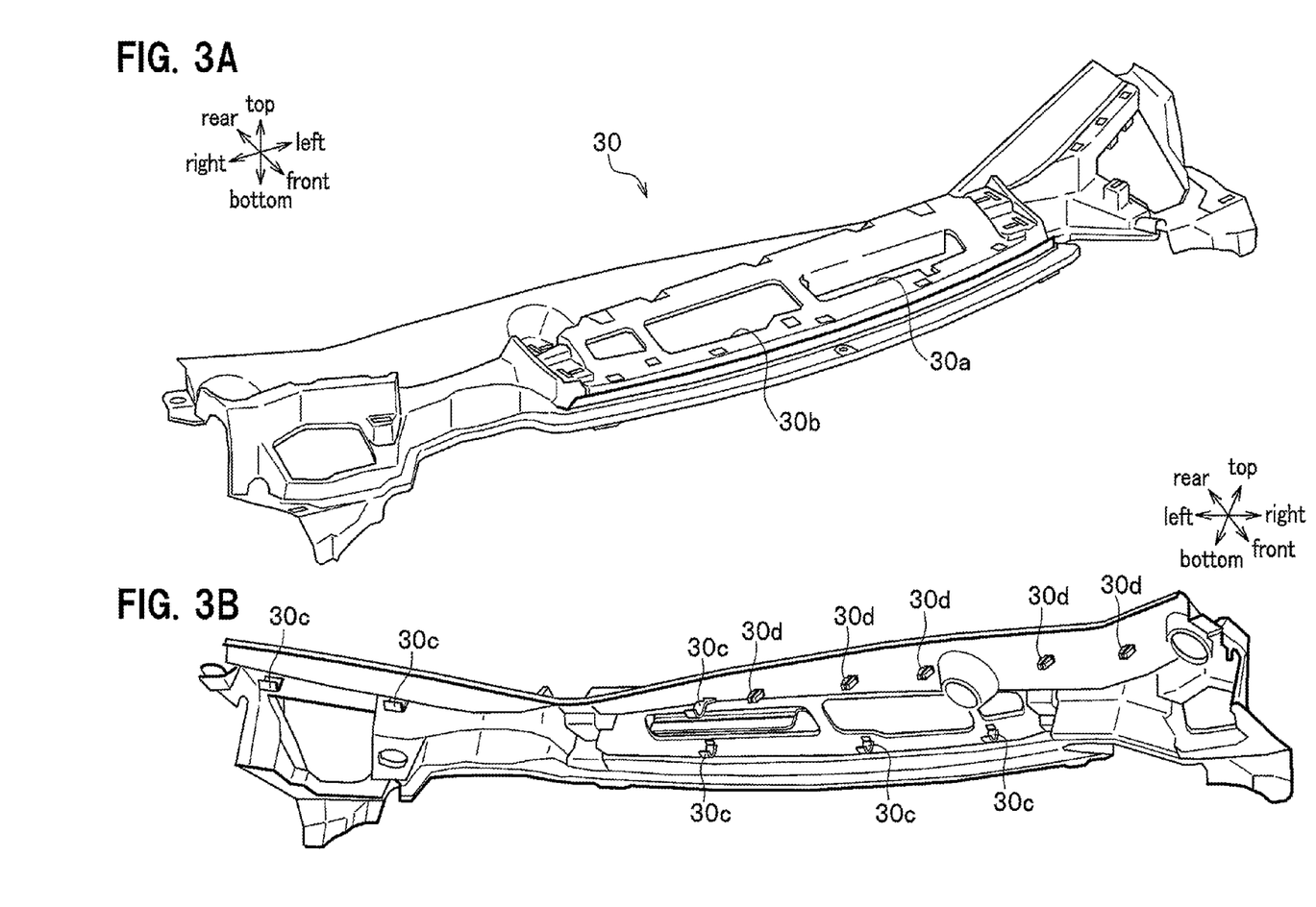
FIG. 3A is a perspective view of a cowl top member according to the embodiment of the present invention, observed downwardly from the right-front direction.
FIG. 3B is a perspective view of a cowl top member according to the embodiment of the present invention, observed upwardly from the right-rear direction.
Figure 4:
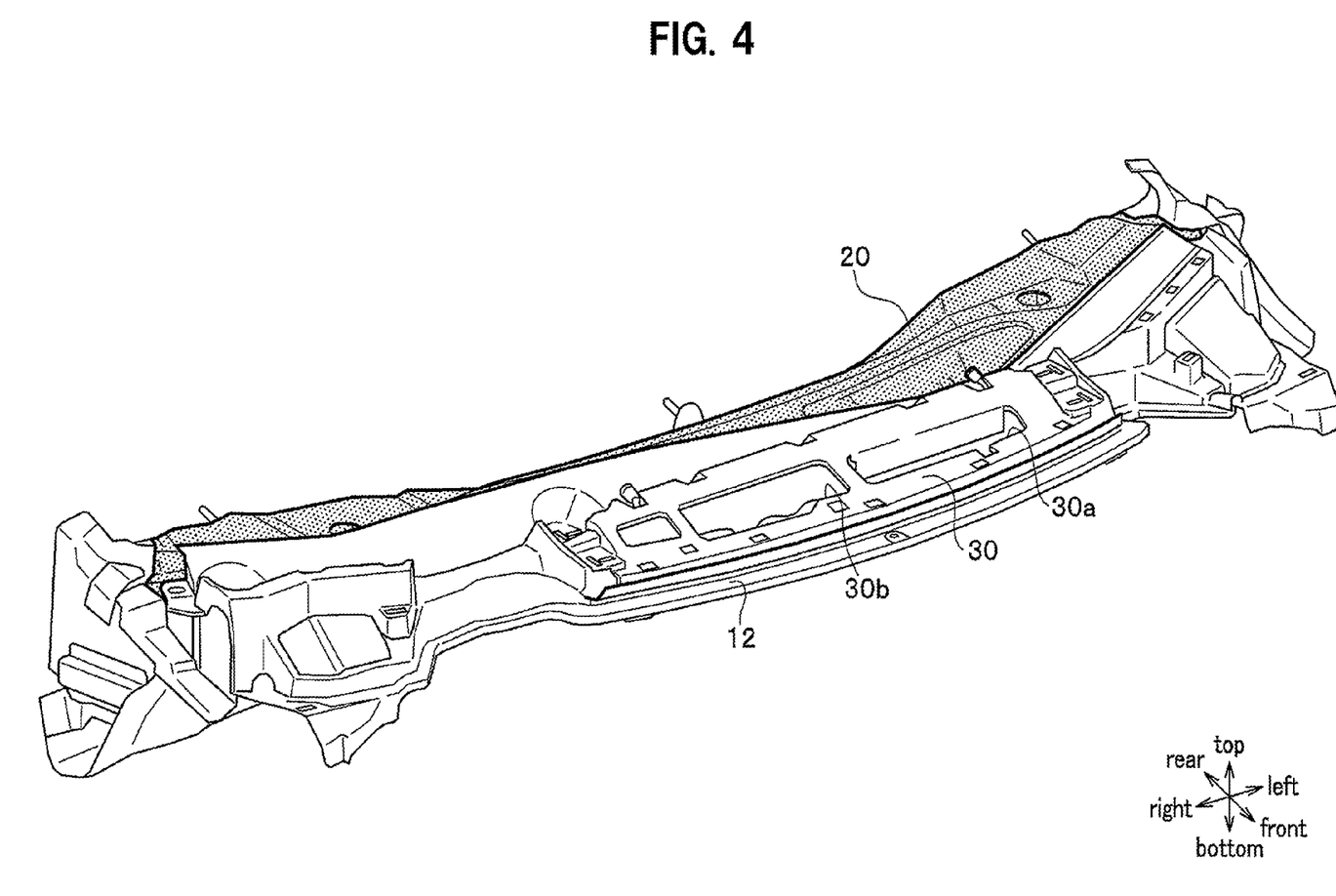
FIG. 4 is a perspective view showing a state in which a cowl top member is assembled on a lid dashboard upper member and a windshield lower member of FIG. 2.

As shown in FIG. 3A and FIG. 3B, the cowl top member 30 comprises an air-intake port 30a of an air-conditioner and a frame number check opening 30b formed near the center in the vehicle width direction, as well as positioning ribs 30c and locking clips 30d as a plurality of locking portions provided at its lower end. The frame number check opening 30b is positioned in the obliquely front-upward direction from the extended portion 22 shown in FIG. 1. By locking the positioning ribs 30c and the locking clips 30d onto the holes, cutouts or edges formed in the lid dashboard upper member 12 and the windshield lower member 20, the cowl top member 30 is secured on the lid dashboard upper member 12 and the windshield lower member 20, straddling therebetween as shown in FIG. 4.

Next, the windshield lower member main body 21 and the extended portion 22 will be described in detail with reference to FIG. 5 to FIG. 7.

Figure 5:
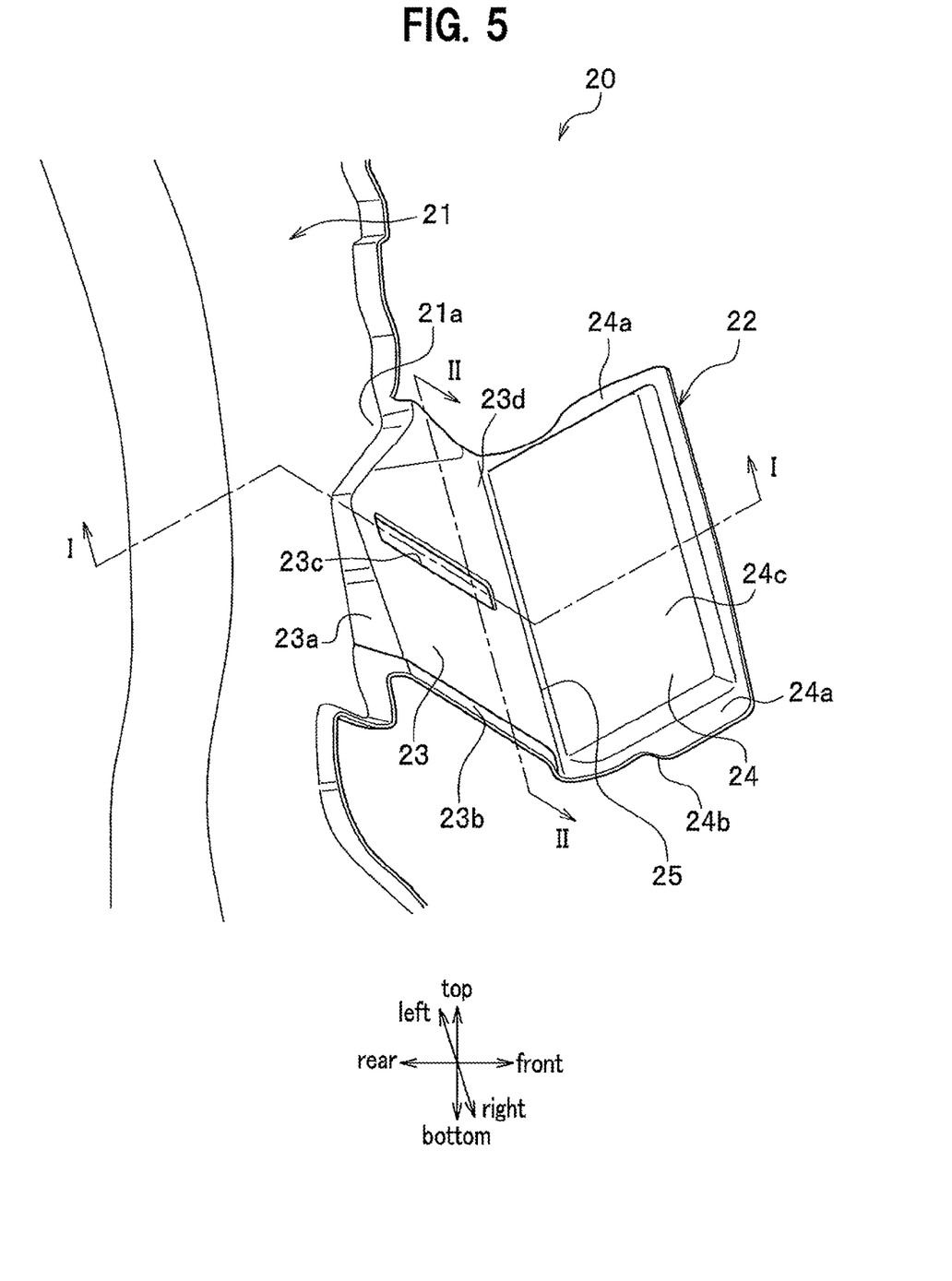
FIG. 5 is a partially enlarged perspective view of an extended portion of a windshield lower member observed from an arrow-X direction shown in FIG. 2.

FIG. 5 is a partially enlarged perspective view of the extended portion 22 of the windshield lower member 20 observed from the arrow-X direction shown in FIG. 2. FIG. 6A is a sectional view across line I-I shown in FIG. 5, and FIG. 6B is a sectional view across line II-II shown in FIG. 5. FIG. 7 is a plan view of the lid dashboard upper member 12 and the windshield lower member 20 according to the embodiment of the present invention.

The windshield lower member main body 21 is a plate-shaped portion molded so as to be bent at a plurality of positions. As shown in FIG. 7, the windshield lower member main body 21 has a left-right asymmetrical shape in plan view, and at its left side end portion 21b there is formed a maximum portion 21d at which width dimension L is largest in the front-rear direction. A plurality of holes 21e, 21e are formed through appropriate positions of the windshield lower member main body 21. On these holes 21e, 21e, the locking clips 30d of the cowl top member 30 are locked (refer to FIG. 1 and FIG. 3B).

The extended portion 22 is a portion on which a chassis number (which is called "frame number") for identifying each vehicle is incised, and which damps vibration and noise transmitted to the windshield lower member 20. In other words, the extended portion 22 of the present embodiment is what is called "frame number plate," and vibration absorption function and noise absorption function are given to this frame number plate.

As shown in FIG. 5, the extended portion 22 is molded integrally with the windshield lower member main body 21, and is formed in a bent shape projecting downward by being bent toward the obliquely front-upward direction at a portion substantially center in the front-rear direction.

The extended portion 22 mainly comprises a base portion 23, a weight portion 24, and a weak portion 25.

The base portion 23 is a plate-shaped portion which is formed so as to continue from the front end portion 21a of the windshield lower member main body 21, and which extends obliquely front-downward from the front end portion 21a. As shown in FIG. 5 and FIG. 6A, a stair-like first step 23a, which is formed convex upward, is provided in the base portion 23 near the boundary with the front end portion 21a (portion adjacent to the front end portion 21a). As shown in FIG. 5 and FIG. 6B, a stair-like second step 23b, which is formed convex upward, is provided at the right edge of the base portion 23.

At the center of the base portion 23, an elongate hole 23c, which has a rectangle shape in planar view and extends in the obliquely front-rear direction, is formed so as to penetrate therethrough. The hole 23c, which is a connecting portion, is locked with a locking clip 30d of the cowl top member 30 (refer to FIG. 1 and FIG. 3B). In the base portion 23, the portions except the first step 23a, the second step 23b and the hole 23c are formed in a flat plane.

The weight portion 24 is a plate-shaped portion that extends in the obliquely front-upward direction from the front end portion 23d of the base portion 23, and has a function of damping vibration and noise transmitted to the windshield lower member 20 from the engine room 2 by antiphase vibration (oscillation) in the up-down direction (vertical direction). At both left and right ends of the weight portion 24, flange-shaped protruding portions 24a, 24a are formed so as to extend outward in the vehicle width direction. These protruding portions 24a protrude more outward in the vehicle width direction than the both left and right ends of the base portion 23 and the weak portion 25.

In substantially all area of the weight portion 24, a third step 24c is formed convex upward. A chassis number, which is not shown, is incised on the lower surface 24b of the weight portion 24. If checking of the chassis number is needed, an operator can read the chassis number by visually confirming the lower surface 24b of the extended portion 22 through the frame number check opening 30b (refer to FIG. 1).

It is noted that plate thicknesses of the base portion 23 and the weight portion 24 (the extended portion 22) are not limited particularly, but preferably set to 0.6 mm for example, and preferably set thinner than the plate thickness of the windshield lower member main body 21.

Figure 6A:
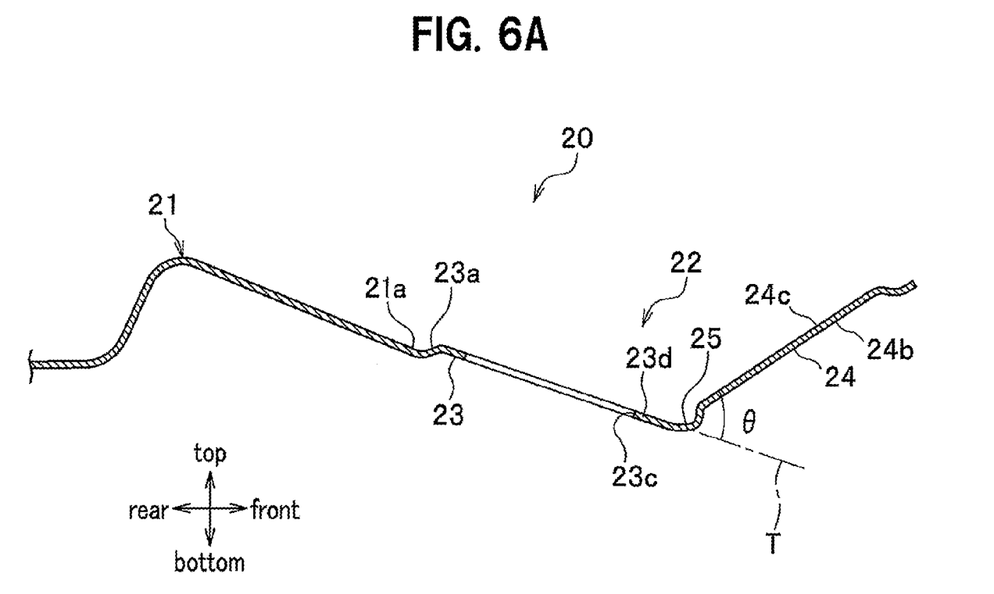
FIG. 6A is a sectional view across line I-I shown in FIG. 5.
Figure 6B:
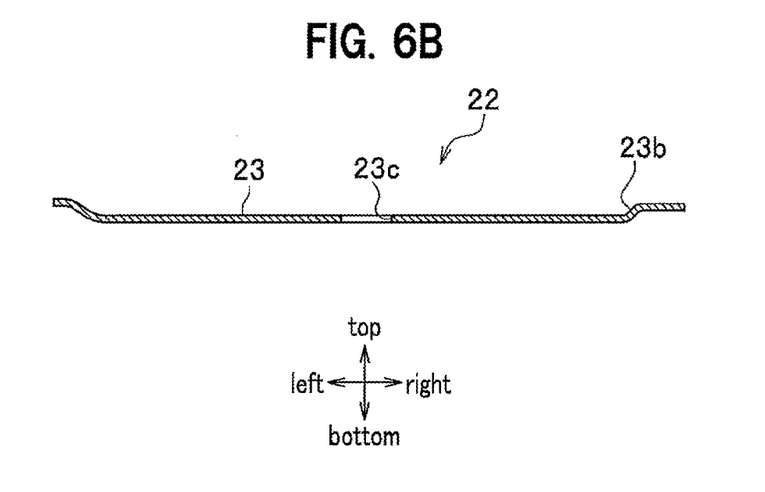
FIG. 6B is a sectional view across line II-II shown in FIG. 5.

Moreover, as shown in FIG. 6A, angle θ formed between the base portion 23 and the weight portion 24 (angle θ formed between the weight portion 24 and the extended surface T which is extended from the base portion 23 in the obliquely front-downward direction) is preferably set to about 60° for example. This further enhances damping effect by facilitating vibration of the weight portion 24, while also maintaining high visibility for visual confirmation of chassis number through the frame number check opening 30b (refer to FIG. 1), As shown in FIG. 5, the weak portion 25 is a portion that extends linearly in the vehicle width direction along the boundary between the base portion 23 and the weight portion 24. The weak portion 25 is formed by bending the extended portion 22 at its substantially center portion in the front-rear direction toward the obliquely front-upward direction. Because the weak portion 25 does not have a step for increasing its rigidity, the weak portion 25 has lower rigidity relative to the base portion 23 and the weight portion 24 both having steps. Thus, the weak portion 25 becomes a pivot point of vertical vibration of the weight portion 24, as well as a pivot point that is bent when collision load is applied on the weight portion 24 from upward.

In this case, when vibration and noise generated in the engine room 2 are transmitted to the windshield lower member 20, the weight portion 24, which is farthest from the windshield lower member main body 21, vibrates (oscillates) in the up-down direction with respect to the pivot point at the weak portion 25 having lower rigidity than the base portion 23. As a result, vibration of the weight portion 24 becomes antiphase relative to vibration and noise transmitted to the windshield lower member 20. Thereby, the weight portion 24 can damp vibration and noise transmitted to the windshield lower member 20.

Figure 7:
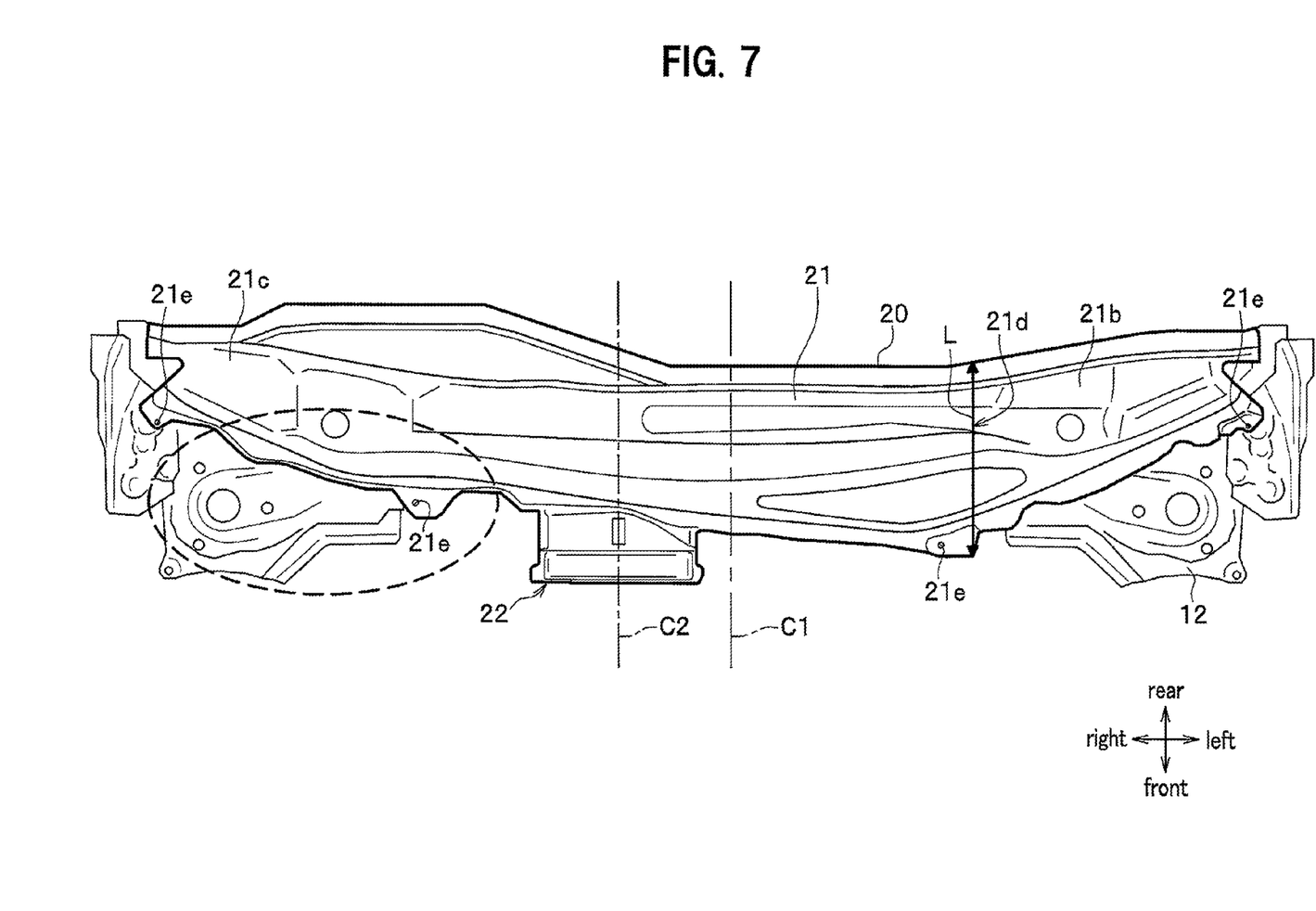
FIG. 7 is a plan view of the lid dashboard upper member and the windshield lower member according to the embodiment of the present invention.

Referring now to FIG. 7, positions of the maximum portion 21d and the extended portion 22 will be explained in detail.

Because a wiper member and so forth (not shown) are mounted via the cowl top member 30 (refer to FIG. 4) above the right end portion 21c of the windshield lower member main body 21 (dotted line in FIG. 7), it is necessary to change the shape of the end portion 21c so as to conform to the shapes of these members. As a result, the shape of the windshield lower member main body 21 becomes left-right asymmetry, and width dimension in the front-rear direction becomes different between left and right. In the present embodiment, the maximum portion 21d is formed at the left end portion 21b of the windshield lower member main body 21, where width dimension L in the front-rear direction is largest. The maximum portion 21d is a portion that vibrates most sympathetically with vibration and noise transmitted from the engine room 2 (refer to FIG. 1), and damping effect is enhanced if the extended portion 22 is provided at a position spaced apart from the most sympathetically vibrating part. Thus, the extended portion 22 of the present embodiment is provided in the area opposite to the maximum portion 21d (on the side of the right end portion 21c) with respect to center line C1 running along the front-rear direction and passing through the center in the vehicle width direction of the windshield lower member main body 21. It is noted that center line C2 running along the front-rear direction and passing through the vehicle width direction of the extended portion 22 is spaced apart from center line C1 outwardly in the vehicle width direction at a predetermined distance, which is set as appropriate.

The vehicle front structure 1 according to the embodiment of the present invention is basically structured as described above. Next, its action and effect will be explained.

According to the present embodiment, when vibration and noise generated in the engine room 2 are transmitted to the windshield lower member 20, the weight portion 24, which is farthest from the windshield lower member main body 21, vibrates (oscillates) in the up-down direction with respect to the pivot point at the weak portion 25 having lower rigidity than the base portion 23. As a result, vibration of the weight portion 24 becomes antiphase relative to vibration and noise transmitted to the windshield lower member 20. Thereby, vibration and noise transmitted to the windshield lower member 20 are damped at the weight portion 24, and transmission of vibration and noise from the engine room 2 into the passenger compartment 3 can be reduced.

Moreover, according to the present embodiment, since the windshield lower member main body 21 is molded integrally with the extended portion 22, the windshield lower member 20 conventionally provided in a vehicle exercises vibration absorption function and noise absorption function. This makes it unnecessary to provide an insulator separately, and makes it possible to reduce the number of components.

Further, according to the present embodiment, since the windshield lower member main body 21 is molded integrally with the extended portion 22, the number of manufacturing steps can be reduced compared to the prior arts that necessarily include a fixing step for fixing an insulator on the dashboard (for example, the invention described in Patent Document 1).

Accordingly, the number of components and the number of manufacturing steps can be reduced, and thereby manufacturing cost can be reduced compared to the prior arts.

Moreover, according to the present embodiment, since the weak portion 25 having lower rigidity than the base portion 23 is provided so as to extend in the vehicle width direction along the boundary between the base portion 23 and the weight portion 24, the extended portion 22 (weight portion 24) becomes susceptible to bending downward with respect to the pivot point at the weak portion 25, and thereby collision energy can be absorbed preferably.

Moreover, according to the present embodiment, since the base portion 23 has the stair-like first step 23a near the boundary with the front end portion 21a of the windshield lower member main body 21 as well as the stair-like second step 23b on the right edge, rigidity of the base portion 23 increases. Thereby, the weight portion 24 becomes susceptible to vertical vibration of the weight portion 24, and thus damping effect can be further enhanced.

Moreover, according to the present embodiment, since the base portion 23 is connected with the cowl top member 30 via the hole 23c, rigidity of the base portion 23 is increased. Thereby, the weight portion 24 becomes susceptible to vertical vibration, and thus damping effect can be further enhanced.

Moreover, according to the present embodiment, since the weight portion 24 has the protruding portions 24a, 24a protruding outward in the vehicle width direction from the outer ends in the vehicle width direction of the base portion 23 and the weak portion 25, the mass of the weight portion 24 increases. Thereby, the weight portion 24 becomes susceptible to vertical vibration, and thus damping effect can be further enhanced.

Moreover, according to the embodiment, since the extended portion 22 is provided on the side opposite to the maximum portion 21d (right end portion 21c) with respect to center line C1 running along the front-rear direction and passing through the center in the vehicle width direction of the windshield lower member main body 21, damping effect can be further enhanced.

In the above, the embodiment of the present invention is described in detail with reference to the figures, however, the present invention is not limited thereto, but can be changed as appropriate within scope not departing from the spirit of the invention.

Rigidity of the weak portion 25 of the present embodiment is lower than rigidities of the base portion 23 and the weight portion 24, however, the present invention is not limited thereto, but it is preferably lower than rigidity of the base portion 23 at least.

The maximum portion 21d of the present embodiment is formed at the left end portion 21b of the windshield lower member main body 21, however, the present invention is not limited thereto, but it may be formed at the right end portion 21c of the windshield lower member main body 21. In this case, the extended portion 22 is provided at the left end portion 21b.

Moreover, the aforementioned dashboard upper member 11 and lid dashboard upper member 12 may be formed integrally out of a sheet of steel plate member, as the dashboard upper member of the present invention. Also, the dashboard lower member 4, the dashboard upper member 11 and the lid dashboard upper member 12 may be formed integrally out of a sheet of steel plate member. That is, regardless of whether the dashboard lower member 4, the dashboard upper member 11 and the lid dashboard upper member 12 are formed integrally or separately, the portion extending frontward from the dashboard lower member for isolating the engine room from the passenger compartment corresponds to the dashboard upper member of the present invention.

Next, action and effect of the vehicle front structure 1 of the present invention will be explained in more detail with reference to the FIG. 8 to FIG. 9, with a working example and a comparative example.

Figure 8A:
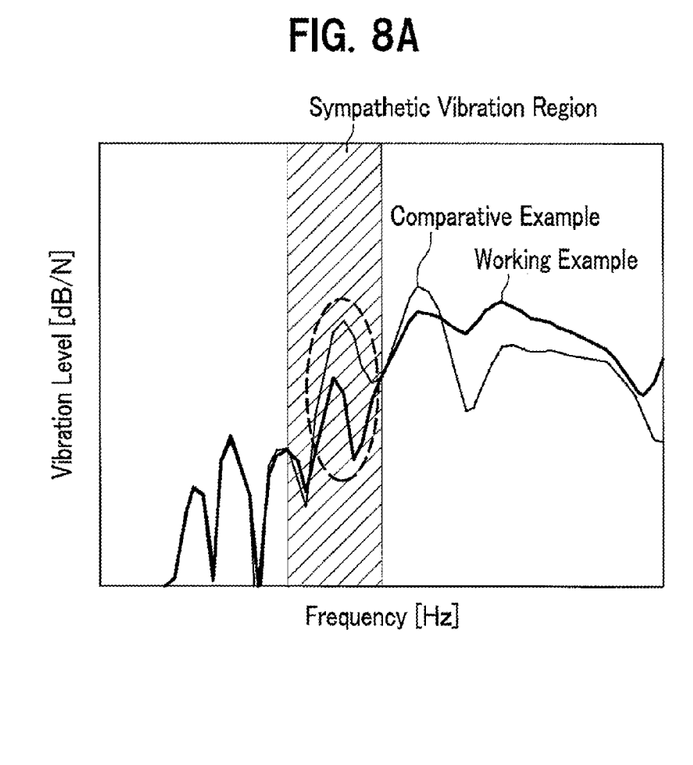
FIG. 8A is a graph in which vertical vibration sensitivity of a working example is compared with vertical vibration sensitivity of a comparative example.
Figure 8B:
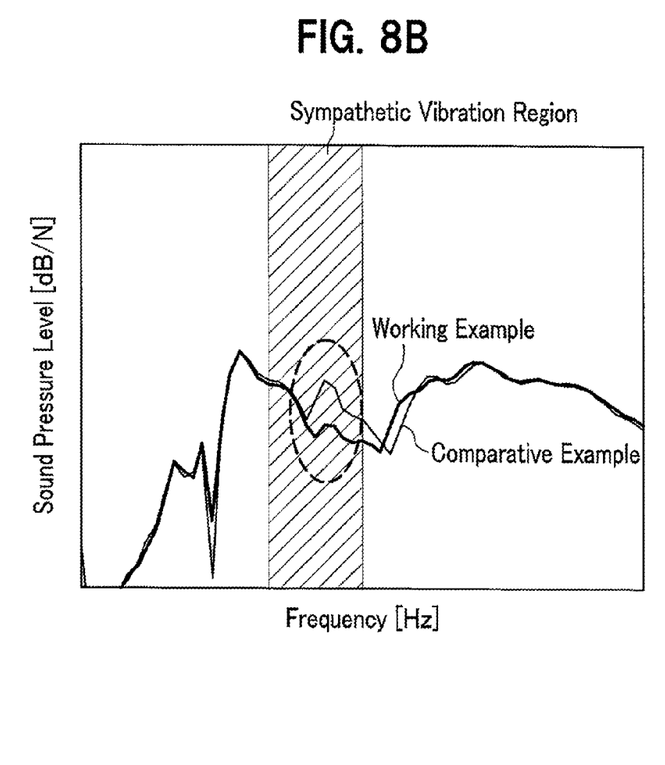
FIG. 8B is a graph in which acoustic sensitivity of the working example is compared with acoustic sensitivity of the comparative example.

In the figures referred, FIG. 8A is a graph in which vertical vibration sensitivity of the working example is compared with vertical vibration sensitivity of the comparative example, and FIG. 8B is a graph in which acoustic sensitivity of the working example is compared with acoustic sensitivity of the comparative example. FIG. 9A is a schematic plan view of a vehicle front structure of comparative example which does not constitute the present invention, and FIG. 9B is a partially enlarged plan view of FIG. 9A.

In the vehicles with the vehicle front structures according to the working example and the comparative example, vertical vibration sensitivity and acoustic sensitivity were measured at the center of the lower end portion of the windshield glass during running the engines.

It is noted that the horizontal axes of FIG. 8A and FIG. 8B represent frequency [Hz], and the vertical axis of FIG. 8A represents vibration level [dB/N], and the vertical axis of FIG. 8B represents sound pressure level [dB/N].

Working Example

The present working example was structured such that the extended portion 22 had the weak portion 25, as in the structure of the aforementioned embodiment. Also, in the present working example, the plate thickness of the extended portion 22 was set thinner than the plate thickness of the windshield lower member main body 21.

Comparative Example

Figure 9A:
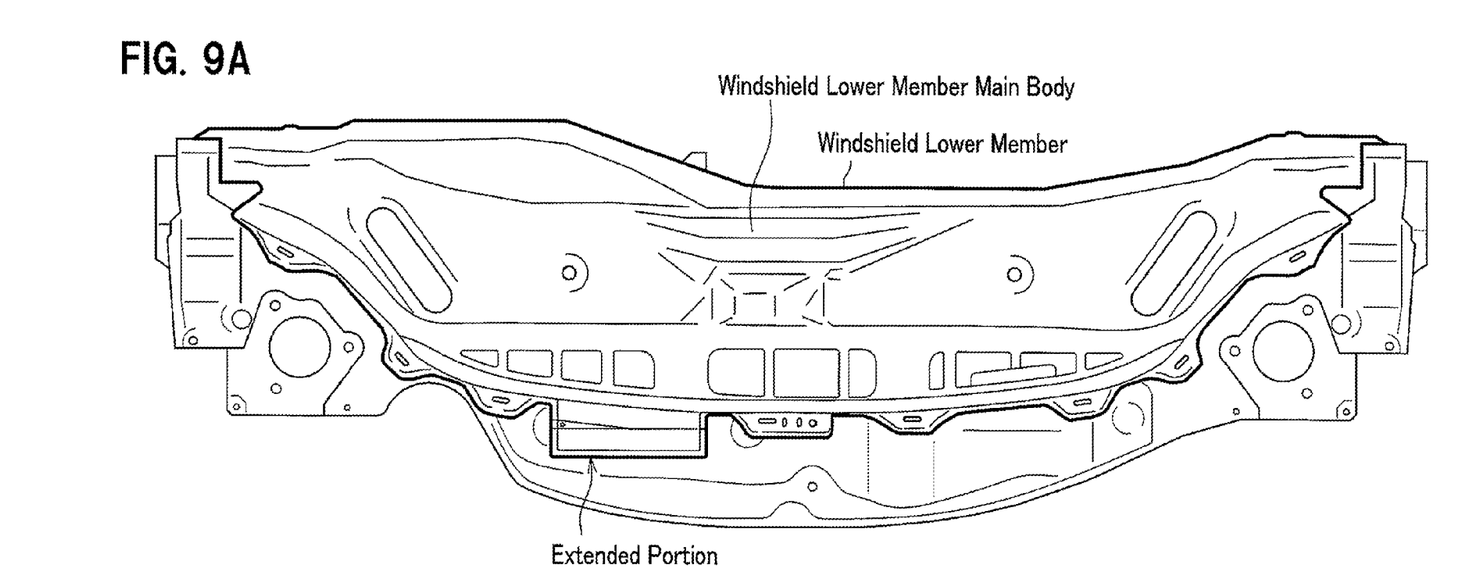
FIG. 9A is a schematic plan view of a vehicle front structure of the comparative example which does not constitute the present invention.
Figure 9B:
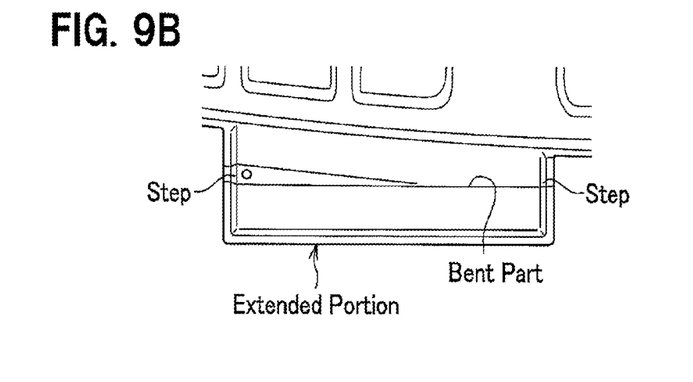
FIG. 9B is a partially enlarged plan view of FIG. 9A.

As shown in FIG. 9A and FIG. 9B, in the present comparative example, steps for increasing rigidity were formed at both left and right ends of the bent part of the extended portion, providing a structure without a weak portion. Also, in the present comparative example, the plate thickness of the extended portion was set equal to the plate thickness of the windshield lower member main body.

Then, the aforementioned measurements were performed to obtain the results shown in the graph of FIG. 8A with regard to vertical vibration sensitivities of the working example and the comparative example. That is, comparing the both results, it was confirmed that, in sympathetic vibration region, the vibration level [dB/N] of the working example was lower than the vibration level [dB/N] of the comparative example (refer to the dotted line in FIG. 8A). Thereby, in the working example, the vertical vibration frequency [Hz] of the windshield glass and the vertical vibration frequency [Hz] of the extended portion 22 (weight portion 24) were shifted from one another across sympathetic vibration region, and thus the capability of damping vertical vibration of the windshield glass was demonstrated.

Moreover, the aforementioned measurements were performed to obtain the results shown in the graph of FIG. 8B with regard to acoustic sensitivities of the working example and the comparative example. That is, comparing the both results, it was confirmed that, in sympathetic vibration region, the sound pressure level [dB/N] of the working example was lower than the sound pressure level [dB/N] of the comparative example (refer to the dotted line in FIG. 8B). Thereby, in the working example, the sound pressure level [dB/N] across sympathetic vibration region falls down, and thus the capability of reducing undesired sound (noise) in the windshield glass was demonstrated.

As a result of comparing the working example and the comparative example as explained above, by forming the weak portion 25 in the extended portion 22, the action and effect was demonstrated in which, when the weight portion 24 vibrated vertically with respect to the pivot point at the weak portion 25, vibration of the weight portion 24 became antiphase relative to vibration and noise transmitted from the engine room 2, and thereby vibration and noise transmitted were damped.

DESCRIPTION OF REFERENCE NUMERALS

1: vehicle front structure (structure for a front portion of a vehicle)
2: engine room
3: passenger compartment (vehicle interior)
5: windshield glass
6: opening
11: dashboard upper member
12: lid dashboard upper member (dashboard upper member)
20: windshield lower member
21: windshield lower member main body
21*a*: front end portion
21*d*: maximum portion
22: extended portion
23: base portion
23*a*: first step
23*b*: second step
23*c*: hole (connecting portion)
23*d*: front end portion
24: weight portion
24*a*: protruding portion
25: weak portion
30: cowl top member
C1: center line
L: width dimension

The invention claimed is:

1. A structure for a front portion of a vehicle, comprising:
   a dashboard upper member extending frontward from an upper portion of a dashboard lower member isolating an engine room from a passenger compartment;
   a windshield lower member supporting a lower end portion of a windshield glass; and
   a cowl top member covering an opening formed between the dashboard upper member and the windshield lower member,
   wherein the windshield lower member includes:
   a windshield lower member main body; and
   an extended portion formed so as to extend frontward from a front end portion of the windshield lower member main body,
   wherein the extended portion includes:
   a base portion formed so as to continue from a front end portion of the windshield lower member main body;
   a weight portion extending in an obliquely front-upward direction from a front end portion of the base portion; and
   a weak portion extending in a vehicle width direction at a boundary between the base portion and the weight portion, the weak portion having lower rigidity than the base portion.

2. The structure for the front portion of the vehicle according to claim 1, wherein the base portion has a stair-like step near a boundary with the front end portion of the windshield lower member main body.

3. The structure for the front portion of the vehicle according to claim 1, wherein the weight portion has a protruding portion protruding outward in the vehicle width direction from outer ends in the vehicle width direction of the base portion and the weak portion.

4. The structure for the front portion of the vehicle according to claim 2, wherein the weight portion has a protruding portion protruding outward in the vehicle width direction from outer ends in the vehicle width direction of the base portion and the weak portion.

5. The structure for the front portion of the vehicle according to claim 1, wherein the base portion has a connecting portion connecting with the cowl top member.

6. The structure for the front portion of the vehicle according to claim 2, wherein the base portion has a connecting portion connecting with the cowl top member.

7. The structure for the front portion of the vehicle according to claim 3, wherein the base portion has a connecting portion connecting with the cowl top member.

8. The structure for the front portion of the vehicle according to claim 4, wherein the base portion has a connecting portion connecting with the cowl top member.

9. The structure for the front portion of the vehicle according to claim 1,
wherein the windshield lower member main body has a maximum portion at which width dimension in a front-rear direction is largest, in either one of two sides in the vehicle width direction with respect to a center line running along the front-rear direction and passing through a center in the vehicle width direction of the windshield lower member main body, and
the extended portion is provided on a side opposite to the maximum portion with respect to the center line.

10. The structure for the front portion of the vehicle according to claim 2,
wherein the windshield lower member main body has a maximum portion at which width dimension in a front-rear direction is largest, in either one of two sides in the vehicle width direction with respect to a center line running along the front-rear direction and passing through a center in the vehicle width direction of the windshield lower member main body, and
the extended portion is provided on a side opposite to the maximum portion with respect to the center line.

11. The structure for the front portion of the vehicle according to claim 3,
wherein the windshield lower member main body has a maximum portion at which width dimension in a front-rear direction is largest, in either one of two sides in the vehicle width direction with respect to a center line running along the front-rear direction and passing through a center in the vehicle width direction of the windshield lower member main body, and
the extended portion is provided on a side opposite to the maximum portion with respect to the center line.

12. The structure for the front portion of the vehicle according to claim 4,
wherein the windshield lower member main body has a maximum portion at which width dimension in a front-rear direction is largest, in either one of two sides in the vehicle width direction with respect to a center line running along the front-rear direction and passing through a center in the vehicle width direction of the windshield lower member main body, and
the extended portion is provided on a side opposite to the maximum portion with respect to the center line.

13. The structure for the front portion of the vehicle according to claim 5,
wherein the windshield lower member main body has a maximum portion at which width dimension in a front-rear direction is largest, in either one of two sides in the vehicle width direction with respect to a center line running along the front-rear direction and passing through a center in the vehicle width direction of the windshield lower member main body, and
the extended portion is provided on a side opposite to the maximum portion with respect to the center line.

14. The structure for the front portion of the vehicle according to claim 6,
wherein the windshield lower member main body has a maximum portion at which width dimension in a front-rear direction is largest, in either one of two sides in the vehicle width direction with respect to a center line running along the front-rear direction and passing through a center in the vehicle width direction of the windshield lower member main body, and
the extended portion is provided on a side opposite to the maximum portion with respect to the center line.

15. The structure for the front portion of the vehicle according to claim 7,
wherein the windshield lower member main body has a maximum portion at which width dimension in a front-rear direction is largest, in either one of two sides in the vehicle width direction with respect to a center line running along the front-rear direction and passing through a center in the vehicle width direction of the windshield lower member main body, and
the extended portion is provided on a side opposite to the maximum portion with respect to the center line.

16. The structure for the front portion of the vehicle according to claim 8,
wherein the windshield lower member main body has a maximum portion at which width dimension in a front-rear direction is largest, in either one of two sides in the vehicle width direction with respect to a center line running along the front-rear direction and passing through a center in the vehicle width direction of the windshield lower member main body, and
the extended portion is provided on a side opposite to the maximum portion with respect to the center line.

* * * * *